May 5, 1925.

L. F. HELLMANN ET AL 1,536,393

AUTOMATIC BRAKE

Filed June 27, 1921

Inventors
Lui F. Hellmann
William W. Baxter

By

Attorney

Patented May 5, 1925.

1,536,393

UNITED STATES PATENT OFFICE.

LUI F. HELLMANN AND WILLIAM W. BAXTER, OF INDIANAPOLIS, INDIANA.

AUTOMATIC BRAKE.

Application filed June 27, 1921. Serial No. 480,746.

*To all whom it may concern:*

Be it known that we, LUI F. HELLMANN and WILLIAM W. BAXTER, citizens of the United States, residing at Indianapolis, in the county of Marion and State of Indiana, have invented certain new and useful Improvements in Automatic Brakes, of which the following is a specification.

Our said invention relates to a signaling device for indicating that the piston in a fluid pressure braking system has developed an over-travel. In such systems, the brakes themselves may be directly applied by pistons moving in cylinders under fluid pressure, or the brakes may be operated by a lever, or system of levers which may form a foundation brake gear as is illustrated in our application No. 420,317, filed October 28, 1920.

It is the purpose of our invention to provide a signaling means in connection with the cylinder which shall give an indication when the piston travels too far, whether this be due to wear of the brake shoes, wear in the joints between the parts or breakage or any other cause. The signal employed is preferably an audible one though the invention is not limited thereto. Preferably the signal does not interfere with the running of the car. It is merely an indication given at each stoppage of the car that the brakes are not in proper operative condition.

Referring to the accompanying drawings which are made a part hereof and on which similar reference characters indicate similar parts, Figure 1 indicates in elevation a preferred form of our invention, Figure 2 a modified form, and Figure 3 another modification.

In the drawings reference numeral 10 indicates a cylinder of ordinary type in which a piston 11 is operated by fluid pressure through a pipe 12. The piston is connected to a brake shoe or brake lever by a yoke 13 and its normal travel is such that an opening 14 through the cylinder wall is not uncovered. This opening may be one of the slack-adjuster holes, if desired, and leads to a pipe 15 which in turn is connected to a whistle or other audible signal 16. The parts will be so arranged that if the piston should travel too far the opening 14 will be uncovered and the signal will be actuated at each operation of the brakes.

The device illustrated in Figure 2 is similar to that of Figure 1, the yoke 13' being adapted to surround a lever or other like instrumentality connected to the brake. At its forward end the yoke is closed and has fastened thereto a shoe 17 adapted to engage a shoe 18 on a pivoted member 19 and move the pivoted member so as to engage contact 20 with contact 21 and thus close the circuit through a battery 22 and an electric bell 23. In place of the bell 23 we may substitute a buzzer, an electric light or any other electrical signaling device. If desired, the circuit may be made to close directly through a contact on the end of the piston rod.

In the modification of Figure 3 reference character 24 indicates an operator's valve connected by a pipe 12 to the cylinder 10 to actuate the piston 11 and, through the yoke 13 attached to said piston, to operate the brakes. Should the piston develop an over-travel, the air under pressure will pass through port 14 (which may be a slack-adjuster hole) and pipe 29 to cylinder 30 and operate the differential pistons 31 and 32 to close the passage between pipe 25 and pipe 33, the latter being connected to the atmosphere. In this situation, the brakes are locked applied as the air cannot be released through pipe 33 until the differential piston again moves to the right. The motorman may release the air lock to permit operation of the brakes through the operator's valve by turning a three-way valve 34 to release the air from pipe 29. The differential piston is normally moved to the right by a spring 28. A small port 35 serves to release the air between the left-hand side of piston 31 and the end wall of the cylinder.

Having thus fully described our said invention, what we claim as new and desire to secure by Letters Patent, is:

1. In a fluid pressure brake system, a cylinder, a piston therein, said cylinder having an opening in its wall beyond the normal path of the piston, and means forming communication between said opening and a signalling device whereby an audible signal is given to the operator on over-travel of said piston, substantially as set forth.

2. In a fluid pressure brake system, a cylinder, a piston therein, and means whereby a fluid operated audible signal is given to the operator on over-travel of the piston, substantially as set forth.

In witness whereof, we have hereunto set our hands and seals at Indianapolis, Indiana, this 8th day of June, A. D. nineteen hundred and twenty-one.

LUI F. HELLMANN. [L. S.]
WILLIAM W. BAXTER. [L. S.]

Witnesses:
CAREY S. FRYE,
M. L. SHULER.